2,838,370
Patented June 10, 1958

2,838,370

RECOVERY OF URANIUM AND THORIUM FROM AQUEOUS SOLUTIONS

George D. Calkins, Worthington, Ohio, assignor to the United States of America as represented by the United States Atomic Energy Commission No Drawing. Application April 9, 1952
Serial No. 281,470

13 Claims. (Cl. 23—14.5)

This invention deals with a process of separating thorium and uranium from aqueous solutions and with the separation of thorium and uranium from rare earth, iron and/or titanium compounds contained in aqueous solutions together with the thorium and uranium values. The invention also deals with the separation of uranium from thorium present in the form of a mixture of their hydroxides. Finally the invention is concerned, too, with the separation of uranium values from thorium values contained in aqueous carbonate solutions.

The process of this invention is of particular advantage in the recovery of uranium and thorium values from monazite sand, although it may satisfactorily be applied to solutions from other sources after they have been adjusted to the conditions necessary for the process of this invention.

Monazite sand, in disintegrated form, is frequently processed by treating it with a hot sodium hydroxide solution whereby a precipitate forms which mainly consists of oxides or hydroxides of the rare earths, thorium, uranium, iron and titanium, while the solution contains the sodium triphosphate formed and any excess of sodium hydroxide. The precipitate is separated from the solution and dissolved in mineral acid, for instance nitric or hydrochloric acid. The hydrochloric acid solutions are preferred for the process of this invention. Due to the composition of monazite sands, these mineral acid solutions, apart from the rare earth contents, usually have a greatly preponderant thorium content and a relatively very low uranium content. It has been rather difficult heretofore to recover these small uranium quantities with satisfactory efficiency.

It is an object of this invention to provide a process of quantitatively separating and recovering very small quantities of uranium values from large quantities of thorium values.

It is another object of this invention to provide a process for the separation of uranium values from thorium values by which a thorium compound of a high degree of purity is obtained.

It is also an object of this invention to provide a process for the separation of uranium values from thorium values wherein a minimum volume of solution has to be processed through the various steps.

These and other objects are accomplished by neutralizing a mineral acid solution containing the thorium and uranium values to a pH value of between 5.2 and 6.2 whereby both, the uranium and thorium values, together with any titanium and iron values, precipitate as the hydroxides, while any rare earth metal values present preferentially remain in solution; separating the precipitate formed from the solution; dissolving the precipitate in a solution containing a mixture of alkali carbonate and alkali bicarbonate; and contacting the carbonate solution of uranium and thorium with a strong-base anion exchange resin whereby the uranium values are adsorbed on said resin while the thorium values remain in solution.

As has been stated above, hydrochloric acid solutions are preferred among the mineral acid solutions. All alkali hydroxides are suitable for neutralization of these acid solutions, and ammonium hydroxide as well as sodium hydroxide have been found particularly satisfactory. Addition of these alkali hydroxides in the form of solutions of a concentration ranging from 8 to 10 N has proved very successful; however, the concentrations may vary widely. While the pH range of from 5.2 to 6.2 gave good results, the preferred pH range is 5.5 to 5.8. At a pH value of 5.8 all of the thorium and uranium present is precipitated. Precipitation by nutralization may advantageously be carried out at room temperature.

In the following Example I details are given on a precipitation experiment by neutralization.

EXAMPLE I

Then pounds of dry, ground monazite sand were reacted with 15 pounds of sodium hydroxide and 17 pounds of water by heating the mixture to 280° F. and agitating at that temperature for about 3 hours. The solution obtained thereby was then diluted with water to a volume of 7 gallons and allowed to digest for 1 hour at 220° F.; by this digestion step subsequent filtration was facilitated. Filtration was carried out at 180° F. under pressure, and the hydrous oxide cake separated thereby was then washed with water to remove any adhering soluble salts. The cake was then dissolved in 15 pounds of a 37% hydrochloric acid, and the solution was heated to 175° F. for 1 hour whereby complete dissolution of the essential ingredients was accomplished.

The hydrochloric acid solution was then diluted with water, and sodium hydroxide was added at room temperature until an equilibrium pH value of 5.8 was reached. The composition of the diluted solution prior to neutralization, that of the precipitate formed and that of the solution remaining after precipitation are shown in the following Table I.

Table I

| Constituent | Initial Solution Concentration, gm./l. | Fraction of Total, Percent | |
|---|---|---|---|
| | | In Solution (after Prec.) | In Precipitate |
| U | 0.21 | 0.7 | 99.3 |
| Th | 8.4 | 0.3 | 99.7 |
| Rare Earths | 74 | 97.7 | 2.3 |
| Fe | 0.85 | 0 | 100 |
| Ti | 1.3 | 0 | 100 |
| P | 0.05 | 0 | 100 |
| Cl | 24 | 99.9 | 0.1 |

Table I clearly shows that by neutralization to a pH value of 5.8 practically all thorium and uranium together with any iron, titanium and phosphorus present are precipitated while the bulk of the rare earth metal values and of the chloride anion is retained in the solution.

It has been found advantageous to subject the precipitate, prior to further processing, to a washing step in order to remove any extraneous ions, such as the nitrate and the chloride anions, which might impair later on the adsorption on the anion exchange resin, and also for the purpose of removing the rare earth metal values that adhere to the hydroxide precipitate. Water is satisfactory for this purpose; however, it has been found advantageous to add a small quantity of sodium nitrate to the wash water whereby flocculation and settling of the solids is assisted.

The precipitate is then ready for leaching with the alkali carbonate for the purpose of dissolving the uranium and thorium hydroxides. Various alkali carbonates and mixtures have been investigated and have been found operative. However, it was discovered that radically improved results were obtained when a mixture of an alkali carbonate and an alkali bicarbonate was employed. This was advantageous for the dissolving step as well as for the subsequent adsorption on the anion exchange resin. A mixture, for instance, of 10 grams of sodium carbonate and 5 grams of sodium bicarbonate per 100 ml. of solution yielded excellent results. Leaching may be carried out at room temperature, and digestion for several hours was found helpful. By the leaching step a further purification of the uranium-thorium mixture from small quantities of rare earths, iron and titanium which might still be present is accomplished since the rare earths, iron and titanium are insoluble in carbonate solutions; any insoluble compounds are removed by filtration.

The carbonate solution obtained by the leaching step is then treated with an anion exchange resin for adsorption. All strong-base anion exchange resins are suitable, but particularly good results were obtained with quaternary amine resins, such as Amberlite IRA-400, manufactured by the Rohm and Haas Company, Philadelphia, Pennsylvania, and Dowex A-1 and Dowex A-2, manufactured by the Dow Chemical Company, Midland, Michigan. Amberlite IRA-400 has proved the very best resin for this process.

The resins should be subjected to a pretreatment for "conditioning" prior to use for the process of this invention. Treatment with a sodium hydroxide solution, for instance, followed by washing with a carbonate solution of a composition similar to that used for leaching of the uranium and thorium hydroxides has been found satisfactory. Very good results have been obtained, for instance, with 10 ml. of a 4% sodium hydroxide solution and 10 ml. of the carbonate solution per 1 gram of resin.

Adsorption may be carried out in a batch procedure or in a semi-continuous or continuous operation. For example, the solution may be passed through a column which is filled with the resin. In the case of batch operation agitation of the mixture has been found helpful. Continuous column operation is the preferred method.

By contacting the anion exchange resin with the uranium-thorium-containing carbonate solution the uranium is adsorbed on the resin while the thorium is practically quantitatively retained in the effluent or supernatant. It was found that a number of ions have an impairing effect on the uranium adsorption; this was found to be true in particular with regard to the nitrate, chloride, and sulfate ions. However, by washing the hydroxide cake as described above all these extraneous anions are removed prior to the carbonate treatment so that they are not present any longer in a concentration that would be harmful to the adsorption on the resin.

The uranium is then separated and recovered from the resin by elution. However, it is advisable to treat the resin first with a sodium carbonate solution, for instance, of a concentration of 5%, in order to remove any small quantities of thorium, phosphorus, iron and titanium, the so-called holdup, which might have been retained by the resin. By this pretreatment step the uranium recovered from the resin will have a higher degree of purity.

Various solutions are suitable as eluents for removal of the uranium from the resin, and in particular have solutions been found advantageous which contain a chloride anion. For instance, a 2.5 N sodium chloride solution has given good results. Elution with a 2 M ammonium nitrate solution followed by washing with a 2 M hydrochloric acid solution, and also treatment with a 2 M sodium chloride solution followed by treatment with 2 M hydrochloric acid solution and subsequently by water have also been found satisfactory.

The thorium may be recovered from the resin effluent by any method known to those skilled in the art. Precipitation with hydrogen peroxide has been found especially advantageous, though, because any uranium that might have remained unadsorbed and that might be contained in the effluent is not precipitated by hydrogen peroxide. A further separation of the thorium from uranium is thus accomplished.

In the following a few examples are given for illustrative purposes only without the intention to have the invention limited to the details given therein.

EXAMPLE II

A synthetic monazite sand carbonate solution was prepared by leaching a well-washed hydroxide precipitate (formed by neutralizing with ammonium hydroxide a solution of thorium, uranyl, and rare earth nitrates) with 1 liter of a solution containing 100 grams of sodium carbonate and 20 grams of ammonium carbonate. This synthetic carbonate solution was passed through 10 grams of Amberlite IRA-400 which was contained in a 1 cm. x 32 cm. column. The compositions of the solution fed into the resin and of the four fractions of the effluent separately collected are given in Table II.

*Table II*

| Fraction Number (250 ml./Fraction) | Uranium, as $U_3O_8$ | | Thorium, as $ThO_2$ (mg./100 ml.) | Rare Earths, as $RE_2O_3$ (mg./100 ml.) |
|---|---|---|---|---|
| | (mg./100 ml.) | Percent Adsorbed | | |
| Original Solution (1 l.) | 17.9 | -------- | 2,320 | 12 |
| 1 | <0.1 | >99.9 | 2,120 | 7 |
| 2 | 13.0 | 27.5 | 2,320 | 11 |
| 3 | 19.9 | [1] −12 | 2,300 | 11 |
| 4 | 21.9 | [1] −22 | 2,330 | 11 |

[1] Indicates removal of uranium from the resin.

The results obtained in this experiment show that in the beginning quantitative adsorption of uranium took place, but that the adsorption soon dropped to zero. This proves that carbonate solutions alone are not very satisfactory for the adsorption process.

In a second experiment a similarly composed synthetic monazite sand carbonate solution was used; this solution had been obtained by the same method as described in the first experiment of this example with the exception that a mixture of 10 grams of sodium carbonate and 3 grams of sodium bicarbonate per 100 ml. of solution had been chosen for leaching the hydroxide mixture. Also in this instance 10 grams of Amberlite IRA-400 were used in the column. The results of this second experiment are summarized in Table III.

*Table III*

| Fraction Number (250 ml./Fraction) | Uranium, as $U_3O_8$ | | Thorium, as $ThO_2$ (mg./100 ml.) | Rare Earths, as $RE_2O_3$ (mg./100 ml.) |
|---|---|---|---|---|
| | (mg./100 ml.) | Percent Adsorbed | | |
| Original Solution | 19.3 | -------- | 1,320 | 5.4 |
| 1 | <0.5 | >99.9 | 1,150 | 6.0 |
| 2 | <0.5 | >99.9 | 1,350 | 7.0 |
| 3 | <0.5 | >99.9 | 1,340 | 5.0 |
| 4 | 0.5 | 97.4 | 1,320 | 4.0 |

Table III shows that with alkali bicarbonate present in the carbonate solution radically improved results are obtained and that all four fractions of effluent contain very little uranium but practically all the thorium and rare earth metal values originally present. The addition of an alkali bicarbonate appears therefore to be critical in order to obtain a good separation of uranium from thorium.

EXAMPLE III

A sodium carbonate-sodium bicarbonate solution (weight ratio of $Na_2CO_3$:$NaHCO_3$=2:1), which had been prepared from Brazilian monazite sand, was passed successively through three 1.8 cm. wide columns each of which contained 100 grams of Amberlite IRA-400. The flow rate of the solution was 600 ml. per hour. After collecting the effluent, the resin in the columns was washed with a sodium carbonate solution to remove the holdup of the original solution. Then the material adsorbed on the resin was stripped off first by washing with a solution of sodium chloride followed by washing with a solution of hydrochloric acid. In the case of the third column, the resin was stripped with a solution of sodium hydroxide and hydrogen peroxide to insure removal of all of the adsorbed uranium. The concentrations of the various solutions and the results obtained are compiled in Table IV.

Table IV

| | Volume, ml. | $U_3O_8$, mg. | $ThO_2$, mg. | Parts of U Per Million of Th |
|---|---|---|---|---|
| Column 1: | | | | |
| Feed | 2,950 | 880 | 47,100 | 20,000 |
| Effluent | 2,990 | <0.6 | 45,700 | <10 |
| 5% $Na_2CO_3$ wash | 290 | 0.15 | 194 | |
| 12% NaCl strip | 500 | 827 | <4 | |
| 6% HCl strip | 500 | 35 | 39 | |
| Material balance | | 98% | 97% | |
| Column 2: | | | | |
| Feed | 2,540 | <0.5 | 38,800 | <10 |
| Effluent | 2,540 | <0.05 | 39,900 | <1 |
| 5% $Na_2CO_3$ wash | 500 | <0.1 | 463 | |
| 12% NaCl strip | 500 | <0.14 >0.06 | 12 | |
| 7% HCl strip | 500 | <0.1 | 40 | |
| Material balance | | | 104% | |
| Column 3: | | | | |
| Feed | 2,070 | <0.04 | 32,500 | <1 |
| Effluent | 2,080 | <0.04 | 32,400 | <1 |
| 5% $Na_2CO_3$ wash | 500 | <0.01 | 585 | |
| 12% NaCl strip | 500 | 0.02 | >13 <16 | |
| 7% HCl strip | 500 | 0.03 | 37 | |
| 4% NaOH—1% $H_2O_2$ strip | 1,000 | 0.03 | <1 | |
| Material balance | | | 102% | |

The effluent from the first column contained less than 10 parts of uranium per million parts of thorium. The method of analysis used for analyzing the effluent from the first column was not adequate for ascertaining the exact quantity of the uranium present. A more refined method of analysis was applied for analyzing the effluents from the second and third columns, and it was found that in both effluents less than 1 part of uranium was present per million parts of thorium. It was not possible analytically to determine any difference between the uranium content of the feed solution for the third column and of the effluent thereof.

It will be understood that this invention is not to be limited to the details given herein but that it may be modified within the scope of the appended claims.

The separation of uranium values per se from aqueous alkaline carbonate solutions by adsorption on strong-base quaternary amine anion exchange resins forms the subject matter of copending application Serial No. 277,899 filed by Garson A. Lutz on March 21, 1952, and granted on February 5, 1957, as U. S. Patent No. 2,780,514.

What is claimed is:

1. A process of recovering uranium and thorium values from aqueous mineral acid solutions comprising adjusting the pH value of said solutions to between 5.2 and 6.2 whereby both uranium and thorium values precipitate; separating the precipitate formed from the remaining solution; dissolving the precipitate in an aqueous solution of alkali carbonate plus alkali bicarbonate; contacting the carbonate solution obtained with a strong-base anion exchange resin whereby the uranium values are adsorbed on the resin while the thorium values remain in solution.

2. A process of recovering uranium and thorium values from aqueous mineral acid solutions containing uranium, thorium and at least one of the elements selected from the group consisting of rare earth metals, iron and titanium, comprising adjusting the pH value of said solutions to between 5.2 and 6.2 whereby both the uranium values and the thorium values precipitate while any of the rare earth metal values remain in solution; separating the precipitate formed from the remaining solution; dissolving the precipitate in an aqueous solution of alkali carbonate plus alkali bicarbonate; contacting the carbonate solution obtained with a strong-base anion exchange resin whereby the uranium values are adsorbed on the resin while the thorium values remain in solution.

3. The process of claim 2 wherein the mineral acid is hydrochloric acid.

4. The process of claim 2 wherein adjustment of the pH is carried out by adding an ammonium hydroxide solution.

5. The process of claim 2 wherein adjustment of the pH is carried out by adding a sodium hydroxide solution.

6. The process of claim 2 wherein the pH is adjusted at room temperature to between 5.5 and 5.8.

7. The process of claim 2 wherein the precipitate is dissolved in a solution of sodium carbonate and sodium bicarbonate which are present in a weight ratio of from 2 to 4:1, respectively.

8. A process of separating uranium values from thorium values contained in an aqueous alkali carbonate solution comprising thoroughly contacting said solution with a strong-base anion exchange resin whereby the uranium values are adsorbed while the thorium values remain in solution, and separating the uranium-containing resin from the thorium-containing solution.

9. The process of claim 8 wherein the anion exchange resin is a quaternary amine-type resin.

10. A process of separating uranium values from thorium values contained in an aqueous alkali carbonate solution comprising thoroughly contacting said solution with a strong-base anion exchange resin whereby the uranium values are adsorbed while the thorium values remain in solution, and eluting the uranium values from the resin with an aqueous chloride anion-containing solution.

11. The process of claim 10 wherein elution is carried out with a sodium chloride solution.

12. The process of claim 10 wherein elution is carried out with an ammonium nitrate solution followed by aqueous hydrochloric acid.

13. The process of claim 10 wherein elution is carried out with a solution of sodium chloride followed by aqueous hydrochloric acid.

References Cited in the file of this patent

FOREIGN PATENTS

| 249,369 | Switzerland | Apr. 16, 1948 |
| 626,882 | Great Britain | July 22, 1949 |